United States Patent

[11] 3,626,397

[72] Inventor Saburo Uemura
  Kanagawa-ken, Japan
[21] Appl. No. 862,413
[22] Filed Sept. 30, 1969
[45] Patented Dec. 7, 1971
[73] Assignee Sony Corporation
  Tokyo, Japan
[32] Priority Oct. 2, 1968
[33] Japan
[31] 43/71660

[54] DISPLACEMENT MEASURING INSTRUMENT
  7 Claims, 11 Drawing Figs.
[52] U.S. Cl. ..................................... 340/174.1 B,
  324/34 D
[51] Int. Cl. ....................................... G11b 5/04,
  G01r 33/00
[50] Field of Search ........................... 340/174.1,
  174.1 B, 174.1 C, 174.1 F; 324/34 D, 172, 174

[56] References Cited
UNITED STATES PATENTS
2,947,929  8/1960  Bower .......................... 324/172
3,308,449  3/1967  Uemura ....................... 340/174.1 F Primary Examiner—James W. Moffitt
Assistant Examiner—Vincent P. Canney
Attorneys—Lewis H. Eslinger, Alvin Sinderbrand and Curtis, Morris & Safford ABSTRACT: A displacement measuring instrument having means for producing a carrier signal, a transducer supplied with the carrier signal from the above means to phase modulate the carrier signal in accordance with a displacement, means for multiplying the phase-modulated signal, means for demodulating the multiplied, phase-modulated signal and means for counting the displacement with the demodulated signal.

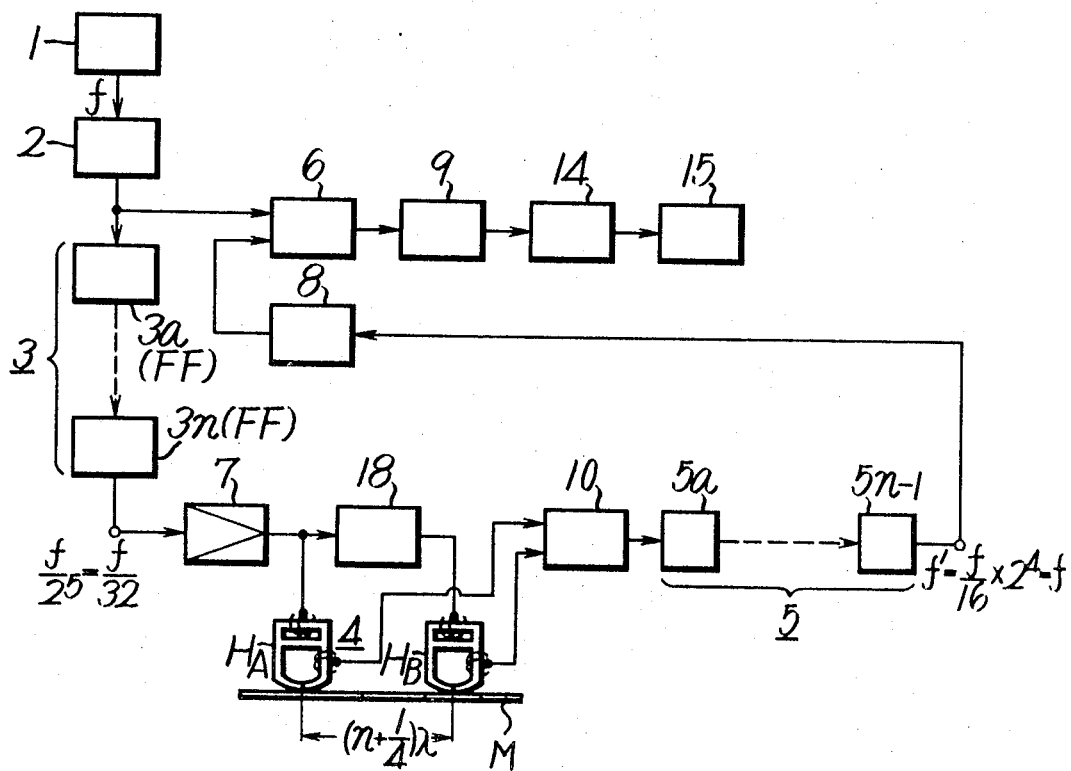
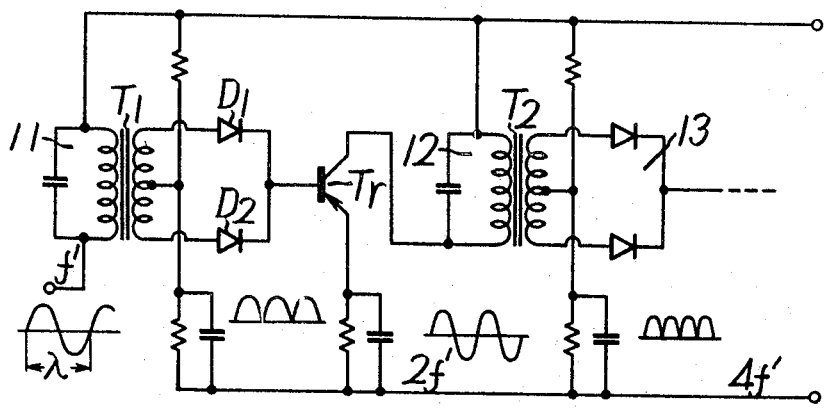
*INVENTOR.*
SABURO UEMURA

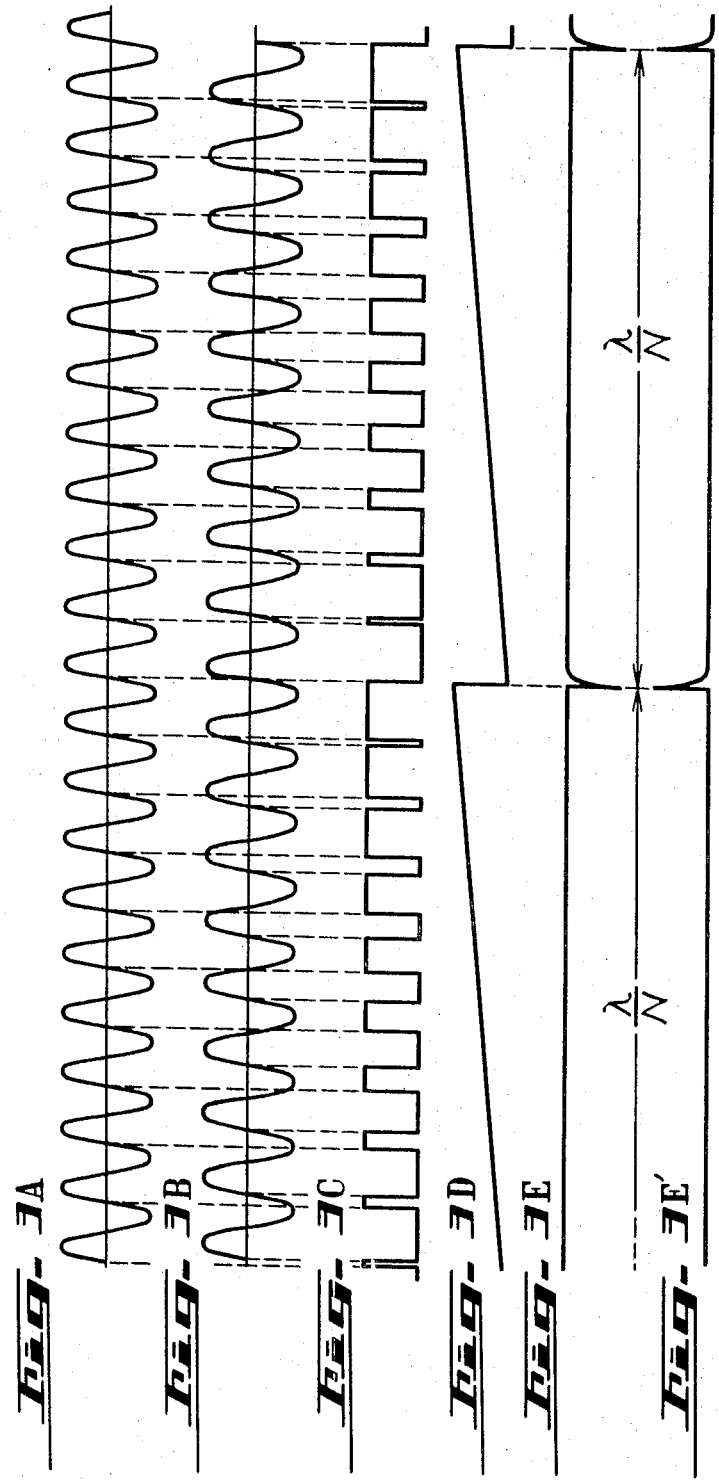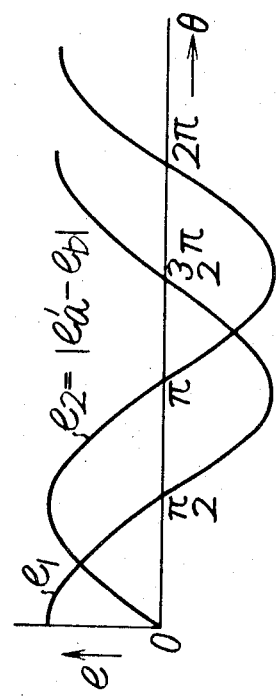

INVENTOR.
SABURO UEMURA 3,626,397

DISPLACEMENT MEASURING INSTRUMENT

CROSS-REFERENCE TO RELATED APPLICATION

U.S. Pat. No. 3,308,499 which issued on Mar. 7, 1967 to Saburo Uemura, entitled "Multigap Magnetic Head" and assigned to the assignee of the present invention discloses a multigap head particularly adapted for reading a magnetic scale to measure length.

BACKGROUND OF THE INVENTION

1. Field of the Invention

This invention relates to a displacement measuring instrument and in particular to a measuring instrument having an interpolating means.

2. Description of the Prior Art

There has heretofore been proposed a displacement measuring instrument for electrically measuring a length of angle which employs a magnetic scale having reference divisions, commonly called magnetic gratings, formed by recording rectangular or sinusoidal signals of a certain wavelength on a magnetic medium such as, for example, as a magnetic tape or a disc and magnetic heads disposed in opposing relation to the magnetic scale and adapted for moving relative thereto and in which the linear or angular displacement between the magnetic scale and the magnetic heads is converted into an electric signal to measure a length or angle. At present, interpolation readout of the order of 10,5 or 2 microns is achieved by the use of a magnetic scale having magnetic gratings of a wavelength of about 200 microns and a digital phase difference detector. The interpolation with the digital phase difference detector necessitates two counters, one providing an incremental indication every wavelength and the other a digital indication of a value less than the wavelength, that is, the interpolated value. However, the necessity of providing two counters introduces complexity into the construction of the counter circuit; and increases the manufacturing cost of the displacement measuring instrument. Further, it is difficult to set to zero or null the counter for digital indication of the interpolated value.

SUMMARY OF THE INVENTION

The present invention deals with a displacement measuring instrument which includes a transducer supplied with a carrier from an oscillator to phase modulate the carrier in accordance with a displacement, means for multiplying the output of the transducer and means for demodulating the multiplied phase-modulated signal and in which a displacement of one wavelength of the transducer is thereby subdivided.

Accordingly, one object of this invention is to provide a novel displacement measuring instrument.

Another object of this invention is to provide an improved displacement measuring instrument which is capable of reading out a displacement of a value less than that of a transducer of one wavelength.

Another object of this invention is to provide a displacement measuring instrument which indicates subdivided counting pulses in an incremental manner.

Another object of this invention is to provide a displacement measuring instrument which can be easily set at zero.

Still another object of this invention is to provide a displacement measuring instrument which is inexpensive and easy to handle.

Other objects, features and advantages of this invention will become apparent from the following description taken in conjunction with the accompanying drawings.

BRIEF DESCRIPTION OF THE DRAWINGS

FIG. 1 is a block diagram showing one example of a displacement measuring instrument produced according to this invention;

FIG. 2 is a connection diagram of a doubler which is suitable for use in the present invention;

FIGS. 3A to 3E' are a series of waveform diagrams for explaining the phase detection and interpolation of a multiplied signal in an instrument according to the present invention;

FIG. 6 is a graph showing the output waveform of the device exemplified in FIG. 5.

DESCRIPTION OF THE PREFERRED EMBODIMENTS

Figure 4:
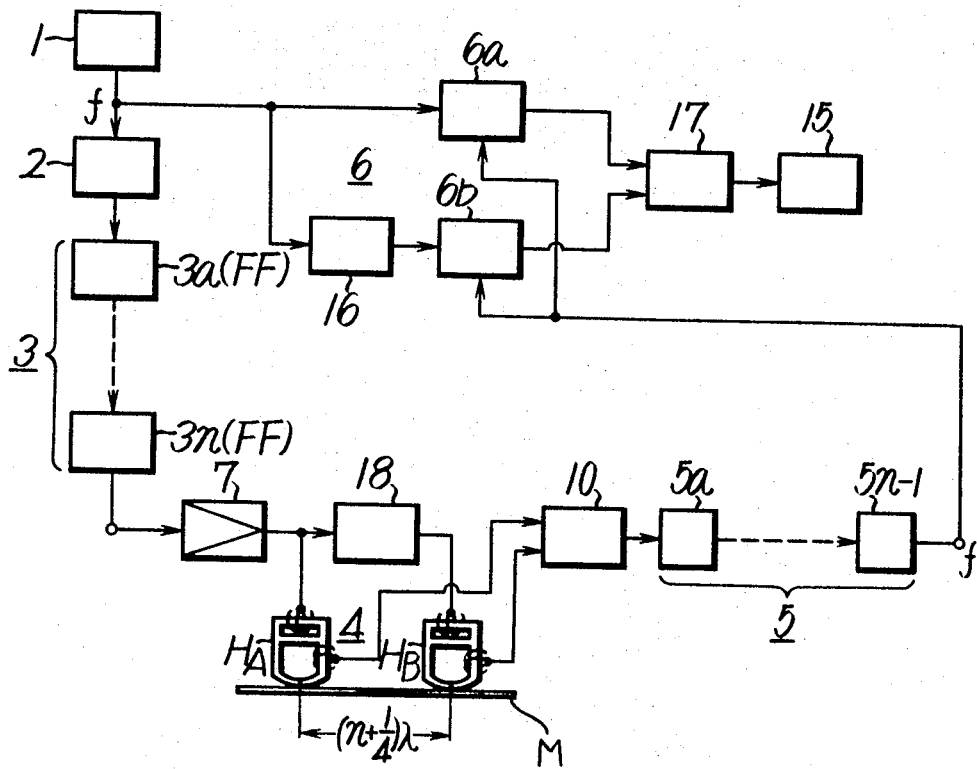
FIG. 4 is a block diagram, similar to FIG. 1, showing another example of this invention.

In FIG. 1 reference numeral 1 indicates a carrier frequently oscillator operating at a certain high frequency $f$, 2 a pulser or pulse generator for converting the signal from the oscillator 1 into a pulse.

The instrument shown on FIG. 1 further comprises a frequency demultiplier circuit 3 ($3_a$-$3_n$) for producing a signal having a frequency of $\frac{1}{2}$" of the carrier frequency $f$ ($n$ being a desired positive integer), that is, a frequency of $f/2^n$, a transducer 4 for converting its displacement into a phase shift of the demultiplied signal having the frequency of $f/2^n$, a frequency doubler circuit 5 ($5_a$-$5_{n-1}$) for multiplying the resulting phase-modulated signal back to the carrier frequency and a detector circuit 6 for detecting the phase of the resulting multiplied signal with reference to the carrier frequency, thereby producing a phase-modulated signal having a phase shift N times the displacement of the transducer 4.

In the illustrated example a signal of the frequency $f$ derived from the oscillator 1 is fed through the pulser 2 to the frequency demultiplier circuit 3 which may be, for example, a flip-flop circuit FF (of five stages in this case) to be demultiplied to $\frac{1}{2}$" and the resulting signal is applied as a carrier through an amplifier 7 to magnetic heads $H_A$ and $H_B$ making up the transducer 4, thus producing phase-modulated carriers of a frequency of $f/2^{n-1}$ at the output side of the magnetic heads. The phase-modulated carriers are frequency-multiplied $2^{n-1}$ times by the frequency doubler 5 (of four stages) to raise its frequency back up to $f$ and is then converted into a pulse by a pulser 8. Then, the multiplied frequency is phase detected by a phase difference detector 6 with reference to the frequency of the oscillator 1. The phase difference detector may be of a conventional type, for example, one in which a flip-flop circuit FF serving as the detector 6 is set and reset by the two signal pulses derived from the aforementioned pulsers 2 and 8, respectively, by which is produced a rectangular wave of a width proportional to the phase difference between the two signals and the resulting rectangular wave is integrated by a filter 9. The magnetic heads $H_A$ and $H_B$ making up the transducer 4 are of the modulation type such as are disclosed in the aforementioned U.S. Pat. No. 3,308,499. These magnetic heads $H_A$ and $H_B$ are spaced apart from each other by a distance of $\lambda(n+\frac{1}{4})$ where $\lambda$ is one wavelength of a magnetic scale M. This is not related directly to this invention and hence will not be described in detail. A phase shifter 18, connected between the output side of the amplifier 7 and the magnetic head $H_B$, shifts the phase of the output signals from the amplifier to the heads $H_A$ and $H_B$ by 90°. The outputs of the magnetic heads $H_A$ and $H_B$ are combined together by a mixer circuit 10, the output of which is fed to the frequency doubler circuit 5.

A description will hereinbelow be given in connection with the frequency multiplication of the phase-modulated signal in the instrument of this invention above described.

Assume that the displacement measuring instrument having the magnetic heads disposed opposite the magnetic scale produces the following output voltage:

$$e_0 = \sin\left(\omega_c t + \frac{2\pi x}{\lambda}\right) \quad (1)$$

where $\omega_c$ is an angular frequency of a carrier, $\lambda$ a wavelength of the magnetic scale and $x$ a relative displacement between the magnetic scale and the magnetic heads. If the above output voltage is frequency-multiplied twice by the frequency doubler, the voltage is as given by the following equation.

$$e_{02} = \sin\left(2\omega_c t + 2 \cdot \frac{2\pi x}{\lambda}\right) \quad (2)$$

When $x$ varies by $\lambda$, the phase of the carrier $2\omega_c$ shifts by $4\pi$. This implies that $\lambda$ is reduced by half, as expressed by the following equation.

$$e_{02} = \sin\left(2\omega_c t + \frac{2\pi x}{\frac{\lambda}{2}}\right) \quad (3)$$

With the provision of $n-1$ stages of the frequency doublers ($n$ being a desired positive integer), the frequency and phase of the output voltage are both multiplied $2^n$ times as follows:

$$e_{02}^{n-1} = \sin\left(2\omega_0^{n-1} t + 2^{n-1} \cdot \frac{2\pi x}{\lambda}\right) \quad (4)$$

When the carrier is at a constant frequency, it can be multiplied $N$ times ($N=2, 3, 4, \ldots$) by a usual multiplier but it is phase-modulated and its instantaneous frequency varies about 10 percent of the carrier frequency, so that it is difficult in practice to greatly multiply it with the single-stage multiplier. The use of the frequency doubler eliminates the difficulty in such a case.

With reference to FIG. 2 a description will be given of a frequency doubler circuit usable in the present invention.

Reference numeral 11 indicates a tank circuit of a high frequency $f'$, which serves as a primary side of a transformer $T_1$ and diodes $D_1$ and $D_2$ are connected to its secondary side, constituting a full-wave rectifier. The rectified output signal of the rectifier is applied to an amplifying transistor $T_r$ to derive from its output side an amplified signal of a frequency $2f'$ and the resulting signal is shaped by a resonance circuit 12 to produce a sine wave of the frequency $2f'$. Further, a similar full-wave rectifier 13 is formed on the secondary side of a transformer $T_2$ using the resonance circuit 12 as the primary side. Thus, the frequency is sequentially doubled. Accordingly, the frequency $f'$ ($f/16$), to which the frequency $f$ of the high-frequency oscillator 1 has been demultiplied by the flip-flop circuits of five stages and the transducer 4 as shown in FIG. 1, can be multiplied up to $f$ by the frequency multiplier 5 employing the doublers of four stages.

Next, a description will be given of means for interpolating the frequency-multiplied signal produced as above described.

The example of FIG. 1 employs the phase detection method for the interpolation of the frequency-multiplied signal. More specifically, in the case of the phase-modulated signal being multiplied $N$ times, the carrier frequency is increased $N$ times and the phase shift is $2N\pi$ per one wavelength as expressed by the equation (4). Consequently, the interpolation of the multiplied signal at the rate of $1/N$ in an incremental manner can be achieved by counting a pulse at every phase shift $2\pi$ of the carrier.

The curve appearing in FIG. 3A represents a signal of the oscillator 1 and FIG. 3B shows a signal produced by sequentially shifting the phase of the above signal. The latter signal is a multiplied and phase-modulated frequency. In such a case, the flip-flop circuit of detector 6 is set and reset with the two signals as previously described with reference to FIG. 1, thereby producing a rectangular wave such as is shown in FIG. 3C and which is of a width proportional to the phase difference $\Phi$ between the two signals. This rectangular wave is produced at intervals of $2\pi$ and is integrated by the filter 9, producing a ramp wave such as is shown in FIG. 3D, and in which the phase difference $\Phi$ between the two signals jumps every $2\pi$. The resulting ramp wave is differentiated by a differentiation circuit 14 to provide a pulse such as is shown in FIG. 3E. Where the displacement is in a negative direction, the width of the rectangular wave of FIG. 3C decreases, the polarity of the ramp wave of FIG. 3D is reversed to produce a pulse shown on FIG. 3E' which is opposite in sense to that shown on FIG. 3E and the pulse of FIG. 3E' is produced at intervals of $\lambda/N$. Namely, with the instrument of FIG. 1, the pulse of FIG. E or E' is produced in response to the positive or negative direction of the displacement and is applied to a counter 15 to indicate the amount of the displacement.

Accordingly, when the magnetic scale is moved a distance corresponding to one wavelength a phase shift of $2N\pi(N=2^{n-1})$ is caused, so that interpolation of $1/N$ can be achieved.

When one wavelength of the magnetic scale is 160 microns, the interpolation of one-sixteenth requires five stages of frequency demultipliers and four stage of frequency doublers.

In the foregoing each subdivided wavelength $\lambda/N$ is counted in an incremental manner. Consequently, there are the following advantages:

1. The instrument can be set to read null at any desired interpolated value, and
2. The counter may be a reversible one.

The counting is distinctly separated from the detection for the interpolation.

Turning now to FIG. 4, another example of this invention will be described in connection with amplitude modulation. In FIG. 4 similar elements to those appearing in FIG. 1 are identified by the same reference numerals. In the illustrated example the phase-modulated frequency of the carrier $N$ times frequency-multiplied is demodulated with demodulators $6a$ and $6b$ to be converted into a low-frequency signal. The illustrated circuit is completed by a $0-°$ phase shifter 16 and a $\lambda/4$ interpolator 17. The phase demodulators $6a$ and $6b$ may be each in the form of the synchronous detector depicted in FIG. 5.

Figure 5:
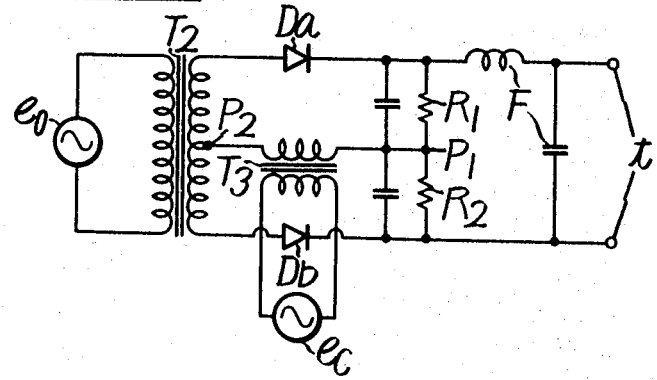
FIG. 5 is a connection diagram illustrating one example of a phase demodulating device which is suitable for use in the instrument of FIG. 4 according to the present invention.

In the synchronous detector of FIG. 5, reference character $e_o$ indicates a signal source, diodes $Da$ and $Db$ are connected to both ends of a secondary coil of a transformer $T_2$ to achieve full-wave rectification and resistors $R_1$ and $R_2$ are connected in series to the output ends of the diodes $Da$ and $Db$ to apply the output of a carrier source $e_c$ between the connection point $P_1$ of the resistors and the center tap of the secondary coil of the transformer $T_2$ through a secondary coil of a transformer $T_3$. Reference character F designates a filter, though which is produced an output signal of the demodulator at terminals $t$. If signals to be applied to the two detectors or demodulators $6a$ and $6b$ are displaced $\pi/2$ apart from each other, there are derived from the output terminals of the demodulators low-frequency signals which are phased 90° apart from each other, as clearly shown in FIG. 6. Such output signals are as follows:

$$e_1 = \cos N \frac{2\pi x}{\lambda} \quad (5)$$

$$e_2 = \sin N \frac{2\pi x}{\lambda} \quad (6)$$

These output signals are exactly the same as those obtained by detecting the outputs of the magnetic heads with the synchronous detectors and the wavelength $\lambda$ is replaced with $\lambda/N$. The above output signals are fed to $\lambda/4$ interpolated 17 to be converted into pulses in both directions, which are thereafter indicated by a counter 15. For the interpolation of the unit of 10 microns in the case of using a magnetic scale having one wavelength of 160 microns, it is sufficient to employ two stages of frequency doublers and to multiply the carrier four times.

With the above interpolation method, the precision of the interpolation is determined when the outputs of the magnetic heads are combined together to provide the phase-modulated signal. The phase shift of the frequency doubler circuit has no influence upon the precision.

An error of 90° in phase of the carrier frequency in the demodulator in an error of the $\lambda/4$ interpolator, so that a difference of $\pm 10°$ does not matter for the overall error in interpolation. The precision of the interpolation may be considered to be dependent only upon the portion where the outputs of the magnetic heads are combined together to provide the phase-modulated signal. In the interpolation of λ/16 the error can be held to for example, one-fourth to one-sixth of the counting unit. The velocity is dependent upon the carrier frequency.

Where the frequency of the oscillator 1 is 50 kHz., an exciting frequency of the magnetic heads is 50/8=6.25 kHz. and the outputs of the magnetic heads which have a frequency of 12.5 kHz. are multiplied four times up to 50 kHz., a signal of up to 5 kHz. is tolerable in the demodulator. The resulting signal is applied to the λ/4 interpolator, in which case a pulse of up to 20 kHz. is permissible. With one pulse being 10 microns, a velocity of 20 cm./sec. (12m./min.) can be measured.

Even if the carrier frequency is raised two to four times, there is no substantial difficulty, so that a rise of the frequency of the oscillator 1 up to 200 kHz. and the exciting frequency of the magnetic heads up to 25 kHz. allows ease in the design of the filter and the permissible velocity can be raised up to 50 cm./sec.

As compared with the interpolation method of the type using the digital phase difference detector, the interpolation method according to the present invention has the following advantages.

1. Since the interpolator is based on the incremental pulse system, its connection to a reversible counter and the design of the circuits are facilitated.
2. Since the interpolator is based on the incremental system, the instrument can be set at zero simultaneously with the interpolation. Further, the instrument is easy to handle and eliminates the use of a goniometer circuit, so that the manufacturing cost of the instrument is low.
3. Since the counter and the interpolator can be completely separated from each other, the manufacture and the assembling are facilitated.
4. The circuits are simple and the instrument of this invention is advantageous in its stability and cost.

It will be apparent that many modifications and variations of the above-described embodiments may be effected without departing from the scope of the novel concepts of this invention.

I claim as my invention:

1. A displacement measuring instrument comprising oscillator means for producing a carrier signal, demultiplier means acting on said carrier signal to provide a demultiplied carrier signal, transducer means supplied with said demultiplied carrier signal and being operative to phase modulate said demultiplied carrier signal in accordance with a displacement, means for multiplying the phase-modulated demultiplied carrier signal, means for demodulating the multiplied phase-modulated signal, and counting means operated by the demodulated signal to indicate said displacement.

2. A displacement measuring instrument according to claim 1, in which said means for multiplying the phase-modulated signal is a frequency doubler.

3. A displacement measuring instrument according to claim 1, wherein said means for demodulating the multiplied phase-modulated signal includes phase-comparator means comparing the phases of said multiplied phase-modulated signal and a reference signal.

4. A displacement measuring instrument according to claim 1, in which said means for multiplying the phase-modulated signal brings back the frequency of the latter to the frequency of said carrier signal, and said reference signal is the carrier signal from said oscillator.

5. A displacement measuring instrument according to claim 1, in which said means for demodulating the multiplied phase-modulated signal includes two amplitude detectors.

6. A displacement measuring instrument according to claim 5, in which said amplitude detectors are supplied with said multiplied phase-modulated signal and with reference signals that are respectively 90° out of phase with each other.

7. A displacement measuring instrument according to claim 6, in which said reference signals are obtained from said oscillator means.

* * * * *